Nov. 28, 1950     A. E. N. LAWRANCE     2,531,634
ACOUSTICAL DIAPHRAGM WITH STIFFENING MEANS
Filed Nov. 19, 1945
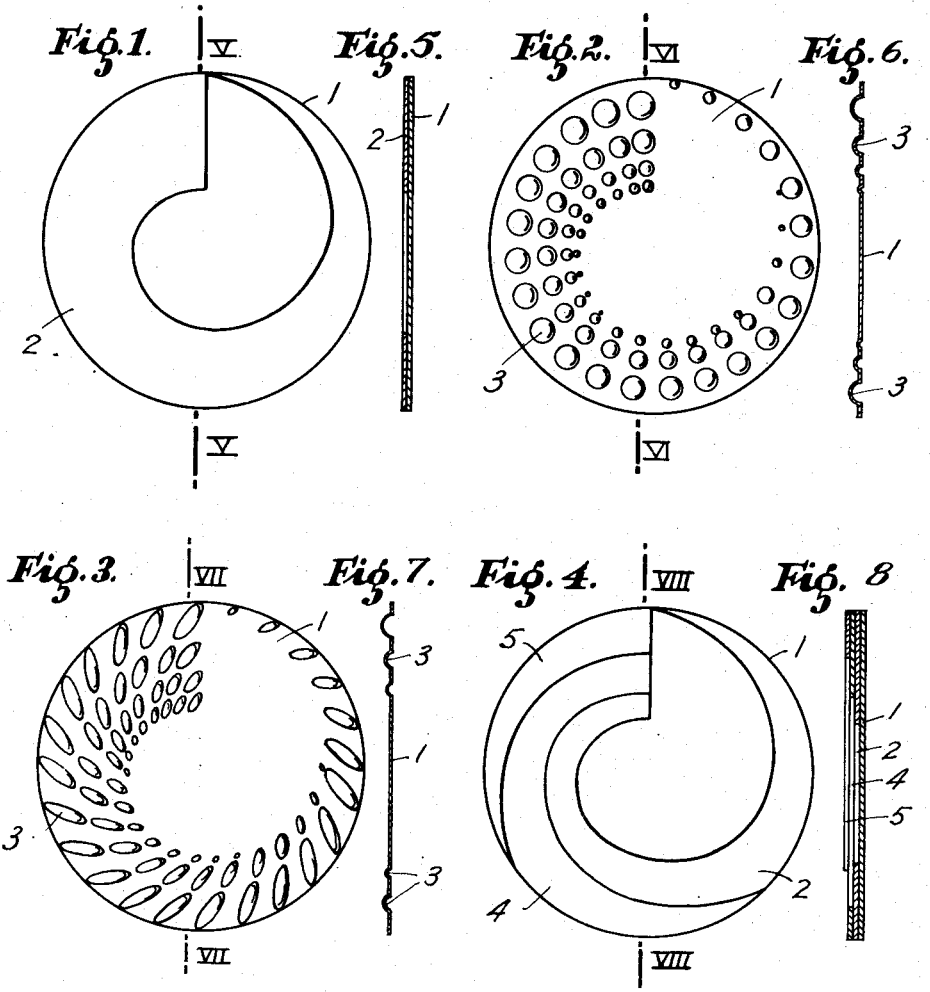
INVENTOR
ATHOL ERNEST NEVILLE LAWRANCE
BY Robert H. Jacob
AGENT Patented Nov. 28, 1950

2,531,634

UNITED STATES PATENT OFFICE 2,531,634

ACOUSTICAL DIAPHRAGM WITH STIFFENING MEANS

Athol E. N. Lawrance, Johannesburg, Transvaal, Union of South Africa

Application November 19, 1945, Serial No. 629,559
In the Union of South Africa January 11, 1945

8 Claims. (Cl. 181—32)

This invention relates to acoustical diaphragms or like acoustical vibratory media (e. g. velocity microphones) such as are used, for example, in telephone receivers, loud speakers, phonographs and the like.

In ordinary diaphragms for this purpose, the mass of the diaphragm is distributed uniformly over its surface area or at least around its axis or circumference. Any departure from this uniformity of distribution which may be necessary or desirable, e. g. to counteract distortion, or render the diaphragm sensitive to a greater or lesser degree to certain frequencies or harmonics, is obtainable only by grinding away more or less of the consistory material of the diaphragm or effecting small variations in the thickness or shape of the diaphragm, which are operations both laborious and expensive and generally unsatisfactory.

In order to improve the sensitiveness of acoustical diaphragms to sound vibrations covering a wide range of frequencies, and thereby enhance the clarity and truth of reproduction or recording of the sound, I have already proposed a special form of diaphragm in which successive sectors of the diaphragm are progressively stiffened throughout the circumferential extent thereof. This was accomplished by making corrugations of uniform depth and width in the metal or consistory material of the diaphragm or superimposing added masses, but such procedure has been found to present practical difficulties in manufacture and also substantial difficulties in the course of testing or research.

The object of the present invention is to overcome the existing difficulties and provide a diaphragm or medium which will be efficiently responsive to a large range of frequencies and which can be readily and satisfactorily modified so as to reduce distortion or render the diaphragm or medium sensitive to a greater or lesser degree to certain frequencies as may be required.

According to the invention, therefore, I provide an acoustical diaphragm or like vibratory medium the surface area of which is loaded with a mass or masses superimposed thereon and/or stiffened by means of corrugations, indentations or the like, the area of said loading and/or stiffening being decreased at a non-uniform rate in successive concentric bands from the circumference or outer edge towards the centre.

Preferably, the said loading and/or stiffening is logarithmic in form although arithmetic, geometric or other variations may be used if desired.

It is also preferred to leave an inner portion of the surface area of the diaphragm or medium unloaded or unstiffened, said portion having a smaller fraction of its concentric area diminishing in area in any particular concentric portion towards the circumference.

In cases where a superimposed mass or masses is or are employed, the depth of said mass or masses normal to the surface of the diaphragm or medium may be varied progressively, and whilst any suitable material may be used for the aforesaid imposition, I have found that substances which can be readily cut or moulded to different shapes or sizes and easily caused to adhere firmly to the surface of the diaphragm or medium, are most suitable. For example, I may use paper or cardboard impregnated with glue and attached to the surface of the diaphragm or medium by varnish or I may use a plastic material attached to the diaphragm or medium by an adhesive. The material is preferably of a stiffer or less flexible nature than the customary material of the diaphragm or medium itself.

Where corrugations or indentations are used, they may be made wider and/or deeper as they recede from the centre and they may also be disposed at an angle, preferably 45°, to the radii of the diaphragm or medium.

Various embodiments of the invention are illustrated in the accompanying drawings, in which:

Figs. 1 to 4 are face views of different forms of diaphragms.

Figs. 5 to 8 are cross-sections taken on the lines V—V; VI—VI; VII—VII; VIII—VIII; of Figs. 1 to 4 respectively.

In Figs. 1 and 5, the diaphragm 1 is formed of a single sheet of material, and a paper mass 2 in the shape of a logarithmic spiral is superimposed upon it and attached by means of an adhesive. As an alternative to superimposing a paper mass on the surface of the diaphragm, such mass may be embodied in the diaphragm, as by diepressing.

In the diaphragm shown in Figs. 2 and 6, a superimposed mass is dispensed with and a corresponding effect is achieved by providing a plurality of corrugations or indentations 3, the size and depth of which increase as they recede from the centre of the diaphragm 1.

Figs. 3 and 7 show corrugations or indentations 3a disposed at an angle of 45° to the radii of the diaphragm 1, which corrugations or indentations are also impressed in arcuate manner.

Referring to Figs. 4 and 8, additional paper masses 4 and 5 are superimposed upon the mass 2.

Where superimposition of mass is employed, it is possible to vary the weight, or distribution of weight of the diaphragm or medium by simply removing some of the superimposed material to the extent to, and at a place or places, which may be ascertained as a result of the performance of the diaphragm or medium under test. The removal or application of the requisite material is a matter which can be quickly, easily and accurately carried out and the exhaustive effort and care which are required if the metal of the diaphragm itself has to be removed by grinding are entirely eliminated. It is thus possible to obtain readily a maximum efficiency of diaphragm performance in regard to accuracy in reproduction, sensitivity and range of response, and efficiency of output. Moreover, it is possible to modify the diaphragm or medium so that its response curve has peaks and troughs to balance out the respective troughs and peaks of a mass produced amplifier or the like, thus giving results equivalent to those which are only at present achieved by means of expensive high fidelity equipment.

In practice it will be convenient first of all to employ a loaded diaphragm and when it has been adjusted for its particular purpose as hereinbefore described, diaphragms or media of this form for actual use may be die-pressed or the loading replaced by die-stamped corrugations or indentations.

I claim:

1. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively.

2. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, the stiffening of said member effected by said stiffening means being substantially logarithmic in its progression.

3. An acoustical diaphragm comprising a thin vbratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, said stiffening means comprising a loading mass of material secured to the sheet material of said vibratory member and having a form, extent and distribution on said vibratory member effecting said stiffening thereof.

4. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, said stiffening means comprising indentations in said vibratory member having forms, sizes and a distribution on said vibratory member effecting said stiffening thereof.

5. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, said stiffening means comprising indentations in said vibratory member having forms, sizes and a distribution on said vibratory member effecting said stiffening thereof, said indentations being of increasing width and depth from the place of minimum stiffening of said vibratory member through the stiffened zone to the place of maximum stiffening of said vibratory member.

6. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, said stiffening means comprising indentations in said vibratory member having forms, sizes and a distribution on said vibratory member effecting said stiffening thereof and being disposed on said vibratory member in an arcuate manner.

7. An acoustical diaphragm comprising a thin vibratory member of continuous and imperforate sheet material of circular form including stiffening means producing a stiffened area in which the stiffening along any arc of constant radius lying wholly in said stiffened area increases progressively and the total linear extent of the stiffening of the successive radii of said arc increases progressively, said stiffening means comprising indentations in said vibratory member having forms, sizes and a distribution on said vibratory member effecting said stiffening thereof, said indentations being elongated and disposed at acute angles to adjacent radii of said vibratory member.

8. An acoustical diaphragm comprising a thin vibratory member of continuous and imperforate sheet material of circular form including stiffening means producing a stiffened area beginning in the outer portion of said vibratory member radially with minimum stiffening effect, said stiffening effect continuing and progressively increasing angularly of said vibratory member to substantially said place of beginning and the radial extent of said stiffened area being a minimum at said place of beginning and progressively increasing angularly of said vibratory member in the same direction to substantially said place of beginning.

ATHOL E. N. LAWRANCE.

REFERENCES CITED

The following references are of record in the file of this patent:

UNITED STATES PATENTS

| Number | Name | Date |
|---|---|---|
| 1,118,345 | Hess | Nov. 24, 1914 |
| 1,738,322 | Schlenker | Dec. 3, 1929 |
| 1,759,328 | Smythe | May 20, 1930 |
| 2,109,012 | Lawrance | Feb. 22, 1938 |